(12) United States Patent
Yokell (10) Patent No.: US 12,136,721 B2
(45) Date of Patent: Nov. 5, 2024

(54) BATTERY BUSBAR TEMPERATURE MANAGEMENT SYSTEM

(71) Applicant: Caterpillar Inc., Peoria, IL (US)

(72) Inventor: David Michael Yokell, Irving, TX (US)

(73) Assignee: Caterpillar Inc., Peoria, IL (US)

( * ) Notice: Subject to any disclaimer, the term of this patent is extended or adjusted under 35 U.S.C. 154(b) by 286 days.

(21) Appl. No.: 17/654,553

(22) Filed: Mar. 11, 2022

(65) Prior Publication Data
US 2023/0291028 A1  Sep. 14, 2023

(51) Int. Cl.
| | |
|---|---|
| *H01M 10/6556* | (2014.01) |
| *B60R 16/08* | (2006.01) |
| *H01M 10/48* | (2006.01) |
| *H01M 10/613* | (2014.01) |
| *H01M 10/633* | (2014.01) |
| *H01M 10/653* | (2014.01) |
| *H01M 10/6568* | (2014.01) |
| *H01M 50/507* | (2021.01) |
| *H02J 7/00* | (2006.01) |

(52) U.S. Cl.
CPC ......... *H01M 10/6556* (2015.04); *B60R 16/08* (2013.01); *H01M 10/482* (2013.01); *H01M 10/486* (2013.01); *H01M 10/613* (2015.04); *H01M 10/633* (2015.04); *H01M 10/653* (2015.04); *H01M 10/6568* (2015.04); *H01M 50/507* (2021.01); *H02J 7/0013* (2013.01); *H02J 7/0063* (2013.01)

(58) Field of Classification Search
None
See application file for complete search history.

(56) References Cited

U.S. PATENT DOCUMENTS

| | | | |
|---|---|---|---|
| 9,490,465 B2 | 11/2016 | Jan et al. | |
| 9,591,789 B2 | 3/2017 | Ide et al. | |
| 9,692,096 B2 | 6/2017 | Harris | |
| 10,454,147 B2 * | 10/2019 | Yang ................. | H01M 10/0525 |

(Continued)

FOREIGN PATENT DOCUMENTS

| | | |
|---|---|---|
| CN | 107946691 A | 4/2018 |
| CN | 113939417 A | 1/2022 |

(Continued)

OTHER PUBLICATIONS

Written Opinion and International Search Report for Int'l. Patent Appln. No. PCT/US2023/062245, mailed May 30, 2023 (13 pgs).

*Primary Examiner* — Scott J. Chmielecki
(74) *Attorney, Agent, or Firm* — Lee & Hayes, PLLC (57) ABSTRACT

A battery system includes a fluid tube that cools busbars of a battery module having one or more cells. The fluid tube is constructed of an electrically insulative/thermally conductive material. Thus, the fluid tube can be affixed directly onto the surface of the busbar. The fluid tube can be used with chilled water to reduce the temperature of the busbars and hot water to increase the temperature of the busbars. The fluid tube can be affixed to the busbars using a flexible joint material that allows for the expansion and contraction of the busbars. The flexible joint material an electrically insulative/ thermally conductive material. The joint material can include a resin and conductive powder.

20 Claims, 8 Drawing Sheets

(56) References Cited

U.S. PATENT DOCUMENTS

| | | | | |
|---|---|---|---|---|
| 11,784,369 B1* | 10/2023 | Wright | ................ | H01M 50/209 |
| | | | | 429/50 |
| 2013/0171480 A1 | 7/2013 | Englert et al. | | |
| 2015/0236386 A1* | 8/2015 | Yang | ................... | H01M 10/658 |
| | | | | 165/104.21 |
| 2017/0288278 A1* | 10/2017 | Ming | ................. | H01M 10/653 |
| 2021/0091437 A1* | 3/2021 | Chen | ................... | H01M 10/625 |
| 2021/0273270 A1* | 9/2021 | Fujikawa | ................ | B60L 58/12 |
| 2021/0296721 A1 | 9/2021 | Omura et al. | | |
| 2022/0093991 A1* | 3/2022 | Cournoyer | .......... | H01M 10/613 |
| 2022/0131209 A1* | 4/2022 | Bartling | ............. | H01M 10/613 |
| 2022/0255156 A1* | 8/2022 | Kato | ................... | H01M 50/211 |
| 2023/0115050 A1* | 4/2023 | Ma | ....................... | C09D 167/00 |
| | | | | 252/74 |
| 2023/0119524 A1* | 4/2023 | Scharkowski | ........... | H02G 5/10 |
| | | | | 429/120 |
| 2023/0253648 A1* | 8/2023 | Omura | ................ | H01M 50/209 |
| | | | | 429/120 |
| 2023/0268576 A1* | 8/2023 | Burkman | ............ | H01M 10/625 |
| | | | | 429/120 |
| 2023/0344035 A1* | 10/2023 | Park | .................... | H01M 50/502 |

FOREIGN PATENT DOCUMENTS

| | | |
|---|---|---|
| JP | 2012-216360 A | 11/2012 |
| KR | 20210122412 A | 10/2021 |
| WO | 2020152567 A1 | 7/2020 |
| WO | 2020260602 A | 12/2020 |
| WO | WO2020/065709 A1 | 8/2021 |

* cited by examiner

BATTERY BUSBAR TEMPERATURE MANAGEMENT SYSTEM

TECHNICAL FIELD

The present disclosure relates to systems configured to improve battery life and support battery functionality. More specifically, the present disclosure relates to a cooling system that controls the thermal state of the battery.

BACKGROUND

Work machines, such as mining trucks, loaders, dozers, compaction machines, or other construction or mining equipment, have been traditionally powered by internal combustion engines. These engines have generally provided power to propulsion system components configured to move the work machine along a travel path, and typically also provide power to an electrical system associated with the work machine. However, the source of power of work machines as well as the use of the electrical systems have evolved. Whereas in the past, combustion engines have been the primary source of motive and electrical power, work machines are increasingly using one or more battery modules as the primary source of energy, either augmenting an internal combustion system in the case of a hybrid work machine, or supplanting the internal combustion system altogether in the case of an electric, non-hybrid (EV) work machine.

The increased power requirements by the battery in a hybrid or EV system can increase the amount of heat generated by the battery supplying that power. As the amount of power (current) discharged from a particular battery increases, the amount of heat generated internally within the cell(s) of the battery also increases. This heat can come from various sources within the battery (within the cells of a battery, for example) or in its construction (such as connectors between cells), often generally described as "resistive heat." Generally, busbars or other such components connected to the battery modules also generate heat as a byproduct during the conductance of electricity.

A mechanism for removing heat generated by busbars is described in Japanese Patent Application No. JP2012216360A (hereinafter referred to as "the '360 reference"). The '360 reference describes removing heat through the use of cooling plates affixed to the positive and negative terminals of the system battery modules. The cooling plates of the '360 reference are made from metal that provides a degree of thermal conductivity that purports to remove enough heat from the battery to maintain the integrity and operational status of the battery. However, the cooling plates of the '360 reference remove heat at a rate controlled and limited by the thermal conductivity of the cooling plates and the air temperature around the cooling plates. As a result, it may be undesirable, or not possible, to use the cooling plates of the '360 reference in applications in which a relatively large amount of heat removal is needed.

Examples of the present disclosure are directed to overcoming deficiencies of such systems.

SUMMARY

In one aspect of the present disclosure, a system includes a battery module, the battery module comprising, a plurality of battery cells, each battery cell of the plurality of battery cells having an anode terminal and a cathode terminal, and a plurality of busbars, the plurality of busbars electrically connecting the plurality of battery cells, via the anode terminal and the cathode terminal of each battery cell, in a parallel configuration, a series configuration, or a combination of a parallel and series configuration. The system further includes a fluid tube defining a coolant channel, wherein the fluid tube is thermally connected to at least one busbar of the plurality of busbars, and constructed from a thermally conductive, electrically insulative material.

In another aspect of the present disclosure, a work machine includes an electric motor, a battery module powering the electric motor, the battery module comprising a plurality of battery cells, each battery cell of the plurality of battery cells having an anode terminal and a cathode terminal, and a plurality of busbars, the plurality of busbars electrically connecting the plurality of battery cells, via the anode terminal and the cathode terminal of each battery cell, in a parallel configuration, a series configuration, or a combination of a parallel and series configuration. The battery module further includes a fluid tube defining a coolant channel, wherein the fluid tube is thermally connected to at least one busbar of the plurality of busbars, and constructed from a thermally conductive, electrically insulative material.

In a still further aspect of the present disclosure, a method of assembling a battery system includes providing a plurality of battery cells having anode terminals and cathode terminals, connecting the plurality of battery cells in a parallel configuration, a series configuration, or a combination of a parallel and series configuration using a plurality of busbars, and thermally connecting a fluid tube to the plurality of busbars, wherein the fluid tube comprises a thermally conductive and electrically insulative material.

DETAILED DESCRIPTION

Systems and technologies described below are directed to battery busbar temperature management systems. Wherever possible, the same reference numbers will be used throughout the drawings to refer to the same or like parts.

Figure 1:
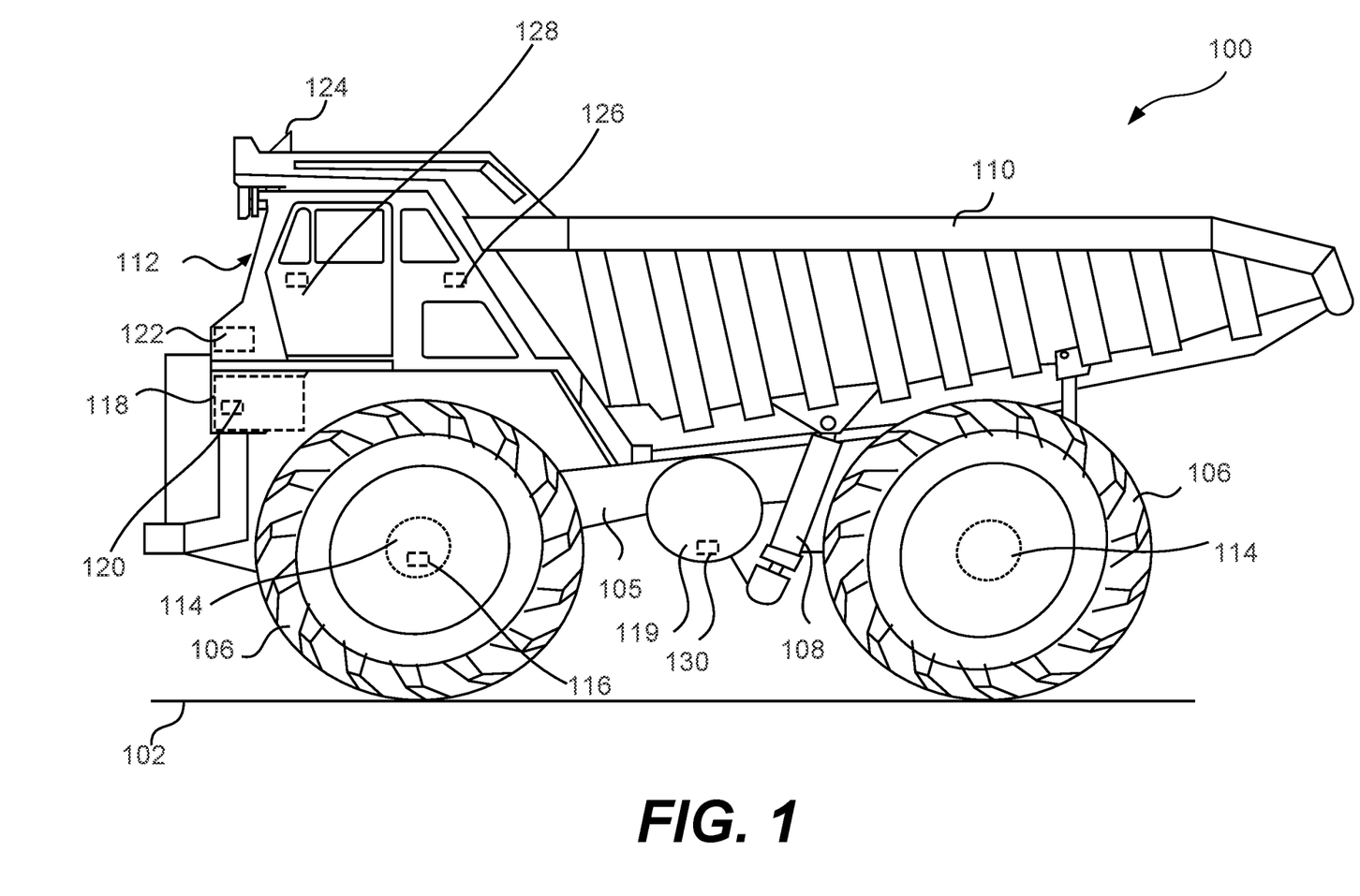
FIG. 1 is a schematic illustration of an example work machine that travels over a surface, in accordance with examples of the disclosure.

FIG. 1 is a schematic illustration of an example work machine 100 that travels over a surface 102, in accordance with examples of the disclosure. The work machine 100, although depicted as a mining truck type of machine, may be any suitable machine, such as any type of loader, dozer, dump truck, skid loader, excavator, compaction machine, backhoe, combine, crane, drilling equipment, tank, trencher, tractor, any suitable stationary machine, any variety of generator, locomotive, marine engines, combinations thereof, or the like. In some examples, the work machine can be a hybrid system, an electric vehicle (no internal combustion engine), or use internal combustion as the primary source of energy. The presently disclosed subject matter is not limited to any particular platform of use and may be implemented across various types of vehicles, installations (i.e. non-vehicle uses), and the like. The work machine 100 of FIG. 1 is merely for purposes of illustration.

As shown in FIG. 1, the work machine 100 includes a frame 105 and wheels 106. The wheels 106 are mechanically coupled to a drive train (not shown) to propel the work machine 100. When the wheels 106 of the work machine 100 are caused to rotate, the work machine 100 traverses the surface 102. Although illustrated in FIG. 1 as having a hub with a rubber tire, in other examples, the wheels 106 may instead be in the form of drums, chain drives, combinations thereof, or the like. The frame 105 of the work machine 100 is constructed from any suitable materials, such as iron, steel, aluminum, other metals, ceramics, plastics, the combination thereof, or the like. The frame 105 is of a unibody construction in some cases, and in other cases, is constructed by joining two or more separate body pieces. Parts of the frame 105 are joined by any suitable variety of mechanisms, including, for example, welding, bolts, screws, other fasteners, epoxy, combinations thereof, or the like.

The work machine 100 may include a hydraulic system 108 that move a dump box 110 or other moveable elements configured to move, lift, carry, and/or dump materials. The dump box 110 is used, for example, to pick up and carry dirt or mined ore from one location on the surface 102 to another location of the surface 102. The dump box 110 is actuated by the hydraulic system 108, or any other suitable mechanical system. In some cases, the hydraulic system 108 is powered by an electric motor (not shown), such as by powering hydraulic pump(s) (not shown) of the hydraulic system 108. It should be noted that in other types of machines (e.g., machines other than a mining truck) the hydraulic system 108 may be in a different configuration than the one shown herein, may be used to operate elements other than a dump box 110, and/or may be omitted.

With continued reference to FIG. 1, the work machine 100 also includes an operator station 112. The operator station 112 is configured to seat an operator (not shown) therein. The operator seated in the operator station 112 interacts with various control interfaces and/or actuators within the operator station 112 to control movement of various components of the work machine 100 and/or the overall movement of the work machine 100 itself. Thus, control interfaces and/or actuators within the operator station 112 allow the control of the propulsion of the work machine 100 by controlling operation of one or more motors 114 that are electric motors, the motors 114 being controlled by a motor controller 116 and powered by a battery module 118. The battery module 118 includes one or more cells that, when electrically connected, provide a battery. The motor controller 116 may be controlled according to operator inputs received at the operator station 112. A battery controller 120 monitors and controls various aspects of the battery module 118, such as controlling a temperature of the battery or the prevention of an over discharge condition.

The motors 114 may be of any suitable type, such as induction motors, permanent magnet motors, switched reluctance (SR) motors, combinations thereof, or the like. The motors 114 are of any suitable voltage, current, and/or power rating. The motors 114 when operating together are configured to propel the work machine 100 as needed for tasks that are to be performed by the work machine 100. For example, the motors 114 may be rated for a range of about 500 volts to about 3000 volts. The motor controller 116 includes control electronics configured to control the operation of the motors 114. In some cases, each motor 114 may be controlled by its own motor controller 116. In other cases, all the motors of the work machine 100 may be controlled by a single motor controller 116. The motor controller 116 may further include one or more inverters or other circuitry to control the energizing of magnetic flux generating elements (e.g., coils) of the motors 114. The motors 114 are mechanically coupled to a variety of drive train components, such as a drive shaft and/or axles or directly to the wheels 106 to rotate the wheels 106 and propel the work machine 100.

The drivetrain includes any variety of other components including, but not limited to a differential, connector(s), constant velocity (CV) joints, etc. Although not shown here, there may be one or more motors 114 that are not used for propulsion of the work machine 100, but rather to operate pumps and/or other auxiliary components, such as to operate the hydraulic systems 108. According to examples of the disclosure, the power to energize the motors 114 is received from the battery module 118. It should be noted that, in some cases, the battery module 118 may provide power for operating the motors 114 and/or other power consuming components (e.g., controllers, cooling systems, displays, actuators, sensors, etc.) of the work machine 100. As noted above, the presently disclosed subject matter is not limited solely to the use of battery power, as other forms of energy may be used in conjunction with the power provided by the battery module 118, including, but not limited to, internal combustion engines or fuel cells.

The battery module 118 may be of any suitable type and capacity. For example, the battery module can be a lithium ion battery, a lead-acid battery, an aluminum ion battery, a flow battery, a magnesium ion battery, a potassium ion battery, a sodium ion battery, a metal hydride battery, a nickel metal hydride battery, a cobalt metal hydride battery, a nickel-cadmium battery, a wet cell of any type, a dry cell of any type, a gel battery, combinations thereof, or the like. The battery module 118 may be organized as a collection of electrochemical cells arranged to provide the voltage, current, and/or power requirements of the motors 114. In some cases, the energy capacity of the battery module 118 relative to the energy available from a full fuel tank 119 may be in the range of about 0.2 to about 1.5. In other cases, the energy capacity of the battery module 118 relative to the energy available from a full fuel tank 119 may be in the range of about 0.5 to about 1. In still other cases, the energy capacity of the battery module 118 relative to the energy available from a full fuel tank 119 may be in the range of about 0.7 to about 0.9. It should be understood that the aforementioned ratios are examples, and the disclosure contemplates the battery module 118 energy capacity to the fuel tank 119 energy capacity ratios in ranges outside of the aforementioned ranges.

The work machine 100 includes an electronic control module (ECM) 122 that controls various aspects of the work machine 100. The ECM 122 is configured to receive battery status (e.g., state-of-charge (SOC) or other charge related metrics) from the battery controller 120, fuel level from the fuel tank controller 130, operator signal(s), such as an accelerator signal, based at least in part on the operator's interactions with one or more control interfaces and/or actuators of the work machine 100. In other cases, the ECM 122 may receive control signals from a remote-control system by wireless signals received via an antenna 124. The ECM 122 uses the operator signal(s), regardless of whether they are received from an operator in the operator station 112 or from a remote controller, to generate command signals to control various components of the work machine 100. For example, the ECM 122 may control the motors 114 via the motor controller 116, the hydraulic system 108, and/or steering of the work machine 100 via a steering controller 126. It should be understood that the ECM 122 may control any variety of other subsystems of the work machine 100 that are not explicitly discussed here to provide the work machine 100 with the operational capability discussed herein.

The ECM 122, according to examples of this disclosure, may be configured to provide an indication of remaining energy to operate the work machine 100 on an energy gauge 128. The energy gauge 128, according to examples of the disclosure, may be configured to display the amount of energy available to operate the work machine 100 based at least in part on the amount of charge remaining in the battery module 118. In some cases, the energy gauge 128 may provide an indication of an estimated amount of time the work machine 100 can be operated and/or an estimated amount of range the work machine 100 has remaining. These estimates may be generated based on the amount of charge remaining in the battery module 118, the recent usage of energy by the work machine 100, and/or an estimate of the energy expended per unit time (e.g., power requirement) of a task in which the work machine 100 is engaged. The energy gauge 128 may be configured to display, to an operator seated in the operator station 112, the amount of energy, time, and/or range remaining for operating the work machine 100. Additionally or alternatively, the energy gauge 128 and/or the ECM 122 may be configured to indicate, such as wirelessly via the antenna 124, the amount of energy, time, and/or range remaining for operating the work machine 100 to a remote operating system.

The ECM 122 includes single or multiple microprocessors, field programmable gate arrays (FPGAs), digital signal processors (DSPs), and/or other components configured to control the work machine 100. Numerous commercially available microprocessors can be configured to perform the functions of the ECM 122. Various known circuits are operably connected to and/or otherwise associated with the ECM 122 and/or the other circuitry of the work machine 100. Such circuits and/or circuit components include power supply circuitry, inverter circuitry, signal-conditioning circuitry, actuator driver circuitry, etc. The present disclosure, in any manner, is not restricted to the type of ECM 122 or the positioning depicted of the ECM 122 and/or the other components relative to the work machine 100. The ECM 122 is configured to control the use of energy from the battery module 118 in a manner that enhances the range of the work machine 100.

The work machine 100 further includes any number of other components within the operator station 112 and/or at one or more other locations on the frame 105. These components include, for example, one or more of a location sensor (e.g., global positioning system (GPS)), an air conditioning system, a heating system, communications systems (e.g., radio, Wi-Fi connections), collision avoidance systems, sensors, cameras, etc. These systems are powered by any suitable mechanism, such as by using a direct current (DC) power supply powered by the battery module 118.

As the electrical load on the battery module 118 increases, the amount of heat generated by components of the battery module 118 can also increase. As discussed above, resistive heat is generated when current is carried through and out of the battery module 118. In some circumstances, the heat is generated at a rate that air cooling, i.e. heat loss into an environment around the battery module 118, provides a sufficient rate of heat removal to keep the battery module 118 within temperature parameters; however, in other examples, the rate of heat generation may be significant enough to require a cooling system that can remove the heat at a rate sufficient to keep the battery module 118 within operational parameters. Such an example cooling system is described in more detail in FIG. 2, below.

Figure 2:
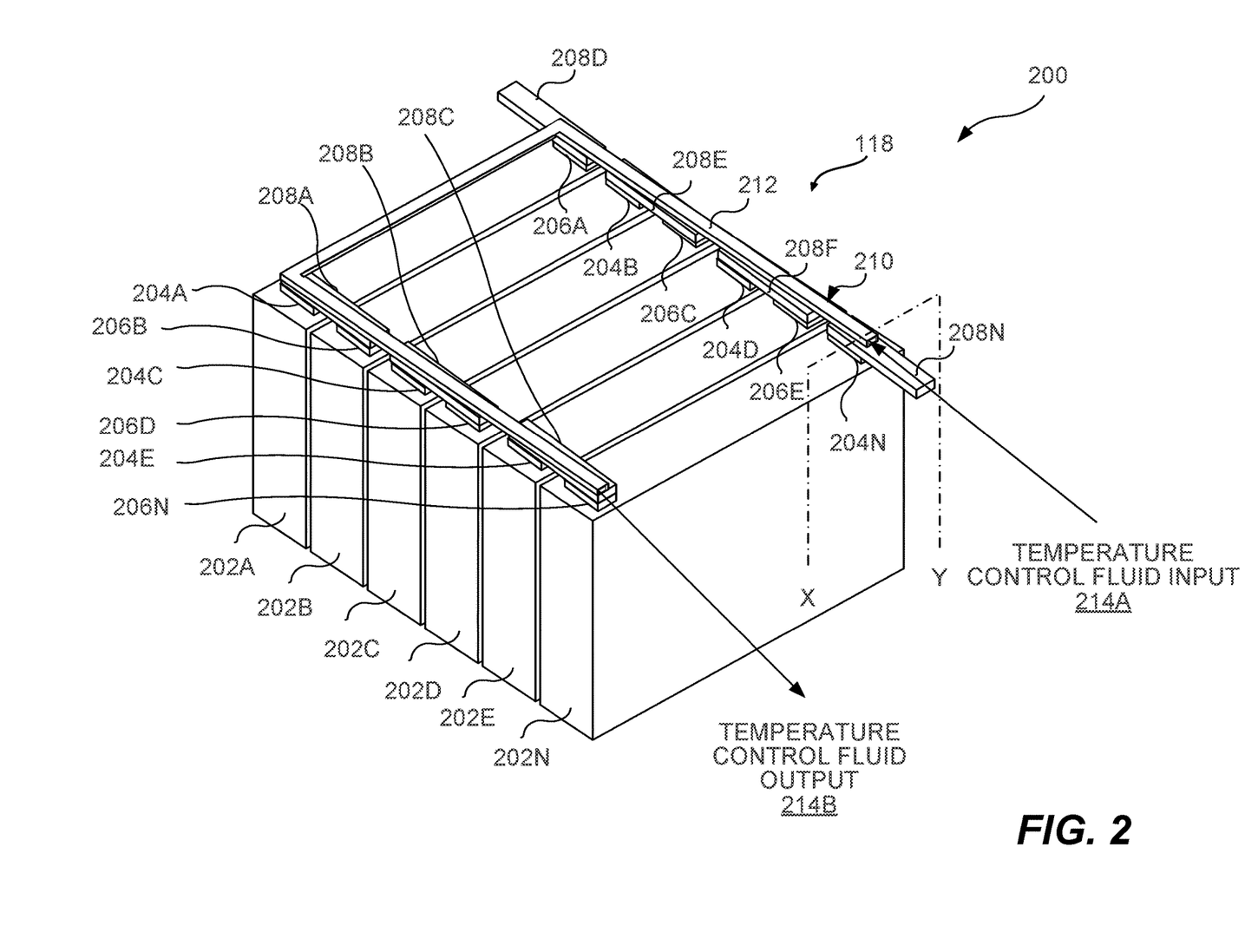
FIG. 2 is an elevated, side view of a battery system used to power systems of a work machine, such as a motor, in accordance with one or more examples of the presently disclosed subject matter.

FIG. 2 is an elevated, side view of a battery system 200 used to power systems of the work machine 100, such as the motors 114, in accordance with one or more examples of the presently disclosed subject matter. The battery system 200 includes the battery module 118. The battery module 118 may be of any suitable type and capacity. For example, the battery module 118 may provide one or more types of batteries such as, but not limited to, lithium ion battery, a lead-acid battery, an aluminum ion battery, a flow battery, a magnesium ion battery, a potassium ion battery, a sodium ion battery, a metal hydride battery, a nickel metal hydride battery, a cobalt metal hydride battery, a nickel-cadmium battery, a wet cell of any type, a dry cell of any type, a gel battery, combinations thereof, or the like.

The battery module 118 includes cells 202A-202N (referred to herein generically as "the cells 202" and individually as "the cell 202A," "the cell 202B," and the like). The cells 202 have an anode and cathode, identified below. The cells 202 may have various other internal components depending on the particular type of battery module 118 being used. Each of the cells 202 has a terminal on an anode and cathode of the cells 202. Illustrated in FIG. 2 are anode terminals 204A-204N (referred to herein generically as "the anode terminals 204" and individually as "the anode terminal 204A," "the anode terminal 204B," and the like) and cathode terminals 206A-206N (referred to herein generically as "the cathode terminals 202" and individually as "the cathode terminal 206A," "the cathode terminal 206B," and the like). The anode terminals 204 are the negative potential of the cells 202 of the battery module 118 and the cathode terminals 206 are the positive potentials of the cells 202 of the battery module 118. As illustrated, the cells 202 are arranged so the anode terminals 204 alternate with the cathode terminals 206. In some examples, the alternating arrangement makes connecting the anode terminals 204 and cathode terminals 206 easier. When connected in various arrangements, the cells 202 can be configured to provide various outputs. For example, if the cells 202 are arranged in a series configuration, the voltage potentials of battery module 118 is increased. If the cells 202 are arranged in a parallel configuration, the amount of current available for use by the battery module 118 is increased.

While some battery modules 118 may have the cells 202 arranged in a series or parallel configuration, other battery modules 118 may have a combination of both, called a series/parallel configuration. Alternatively, or in addition, the battery module 118, and the one or more cells 202 within the battery module 118, can be electrically coupled to one or more additional battery modules to provide a desired amperage output, a desired voltage output, and/or a desired power output for an external system such as the motors 114. For example, the battery module 118 can be configured to nominally output 50.4 volts and can be combined with additional battery modules to provide power to 48 volt nodes, 100 volt nodes, 350-400 volt nodes, 700-750 volt nodes or any other volt nodes. It should be noted that the above numbers are examples and that the individual battery module 118 can be configured to store an amount of amp-hours, discharge an electrical current, and receive an additional electrical current that is defined based at least on an application that the battery module 118 is intended for. Accordingly, the battery module 118 and the one or more cells 202 can be configured as a power source for an external system such as the motors 114.

The battery module 118 of FIG. 2 is connected in a series configuration using busbars 208A-208N (referred to herein generically as "the busbars 208" and individually as "the busbar 208A," the busbar 208B," and the like). The busbars 208 are formed from a conductive material, such as a metal or a conductive polymer, that are coupled to and/or disposed in association with contacts of the one or more cells 202, wherein the contacts of the one or more cells 202 are conductive portions of the cells 202 that are connected to the internal material of the cells 202 and enable the chemical energy to electrical energy reaction that generates an electrical current. The busbars 208 electrically connect anode terminals 204 to the cathode terminals 206 in a series configuration, though as explained above, the battery module 118 can be electrically connected in other configurations. In a series configuration, the busbar 208N acts as a negative terminal of the battery module 118 and the busbar 208D acts as the positive terminal of the battery module 118. If the battery module 118 provides a relatively high voltage, the busbar 208N and 208D can be used to connect the battery module 118 to high voltage applications such as machinery, systems, motors, and/or other components that require power from a high voltage source. If the battery module 118 provides a relatively low voltage, the busbar 208N and 208D can be used to connect the battery module 118 to low voltage applications such as computer systems, sensors, actuators, valves and/or other components that require power from a low voltage source.

As noted above, as current moves through a conductor, heat is generated, generally calculated using the formula H=I^2R, where H is heat (Watts), I is current (Amperes), and R is resistance (Ohms). As the amount of current (I) moving through the busbars 208 increases, the heat (H) generated from resistive losses increases. To remove the heat from the busbars or to add heat to the busbars, a temperature modification system 210 is provided. The temperature modification system 210 includes a fluid tube 212. The fluid tube 212 is in physical and thermal communication (or connection) with an upper surface of the busbars 208, explained in more detail in FIGS. 4 and 5. As used herein, "thermal communication" or "thermal connection," used interchangeable, is defined as being operative to transfer heat via conduction rather than convection or radiation. The fluid tube 212 includes an enclosed or partially enclosed inner void, channel, or passage that provides for the flow of a temperature control fluid from a temperature control fluid input 214A through the fluid tube 212 and out through a temperature control fluid output 214B. It should be noted that the technologies described herein can be used to remove or add heat to the busbars 208, and thus, the fluid is termed a "temperature control fluid." Various types of fluids can be used as a temperature control fluid including, but not limited to, water, air, deionized water, and/or glycol. The presently disclosed subject matter is not limited to any particular type of fluid used as a temperature control fluid. Further, although one fluid tube 212 is illustrated, other technologies for the movement of fluid to remove or add heat may be used including, but not limited to, multiple tubes, hollow plates, and the like.

In the example of FIG. 2 when used to cool, the flow of the temperature control fluid and the temperature of the temperature control fluid removes heat from the busbars 208. To provide for the heat transfer, at least a portion of the fluid tube 212 is constructed from an electrical insulative but thermally conductive material. Using an electrical insulator that also is a heat conductor allows the fluid tube 212 to be in thermal and physical connection with the busbars 208 without needing an insulative material between the fluid tube 212 and the busbars 208. For example, if the fluid tube 212 is formed from an electrical conductor, because the anode terminals 204 and the cathode terminals 206 are at different electrical potentials, direct contact with an electrical conductor can short out one or more of the anode terminals 204 and/or the cathode terminals 206. To prevent this, an insulator or dielectric may need to be used. However, being electrically insulative and thermally conductive, the fluid tube 212 can be in direct contact with one or more of the anode terminals 204 and the cathode terminals 206.

In some examples, at least a portion of the fluid tube 212 in contact with a surface of one or more of the anode terminals 204 and the cathode terminals 206 is formed from aluminum nitride (AlN), which is a solid nitride of aluminum. AlN has a high thermal conductivity of up to 321 W/(m·K) and is an electrical insulator. In some examples, with a thickness of 1.5 mm, AlN has a dielectric strength of around ε=15 kV/mm, a thermal conductivity of around k=180 W/m*k, and a thermal resistance of approximately R=0.0083. Thus, as heat is generated by the busbars 208, the temperature control fluid receives the heat from the busbars through the fluid tube 212 constructed at least partially from AlN, illustrated in more detail in FIG. 3, below.

Figure 3:
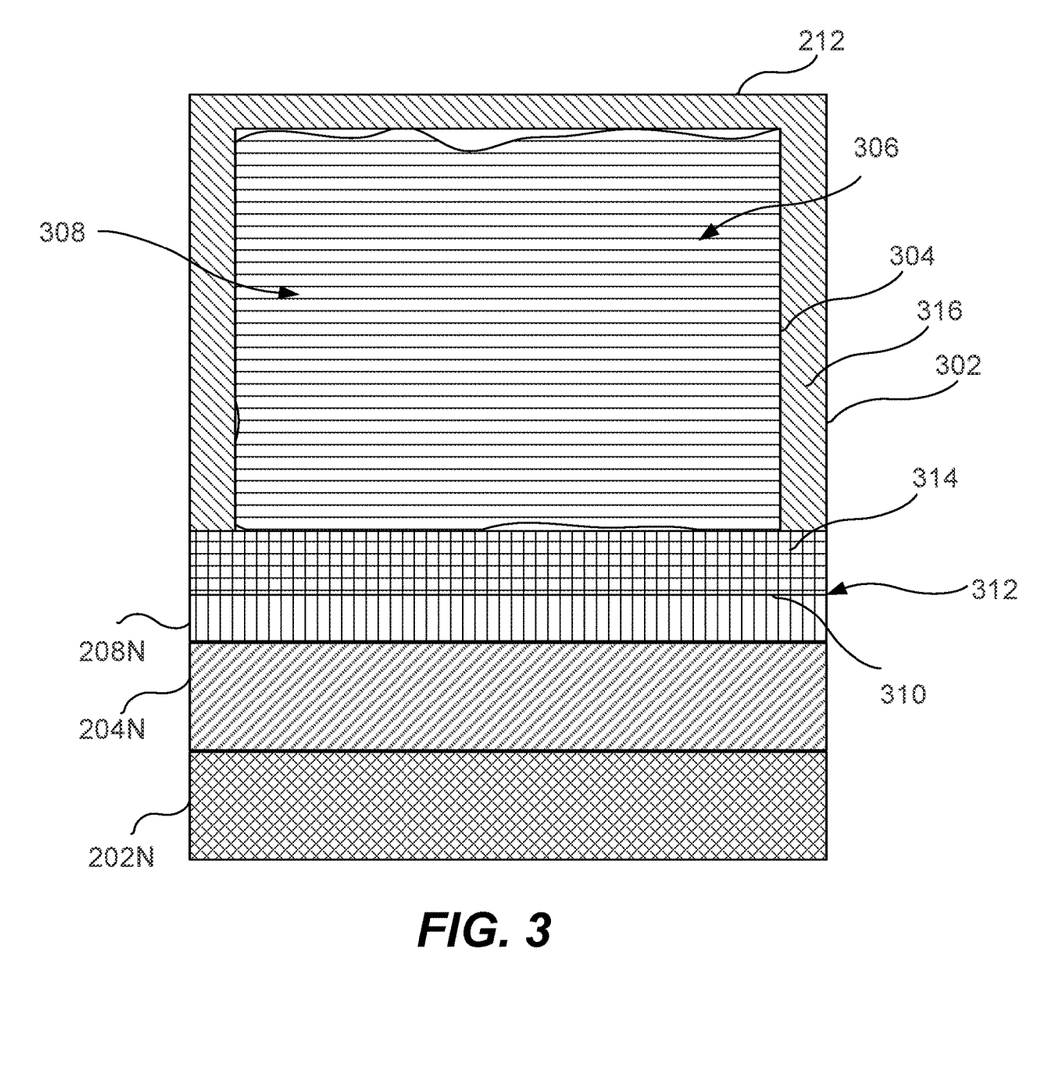
FIG. 3 is a cross-sectional view of a fluid tube, in accordance with one or more examples of the presently disclosed subject matter.

FIG. 3 is a cross-sectional view of the fluid tube 212 taken along cut line XY of FIG. 2, in accordance with one or more examples of the presently disclosed subject matter. Illustrated in FIG. 3 are the cell 202N, which is in electrical contact with the anode terminal 204N. The anode terminal 204N is in electrical contact with the busbar 208N. The fluid tube 212 has an outer wall 302 and an inner wall 304. The inner wall 304 defines a coolant channel 306 through which a temperature control fluid 308 flows. The temperature control fluid 308 removes or adds heat to the busbar 208N through thermal conductivity between an exterior surface 310 of the busbar 208N and the outer wall 302 of the fluid tube 212 at thermal interface 312.

As noted above, the fluid tube 212 can be constructed from a single material, such as AlN or more than one material. In an example of construction with more than one material, the portion of the fluid tube 212 in contact with the busbar 208N that conducts heat can be constructed of a material that provides for heat transfer and electrical insulation, whereas the portion of the fluid tube 212 that is not in contact with the busbar 208N and is not used to conduct heat into or from the busbar 208N can be constructed of a second material that is electrically conductive and/or thermally insulative. For example, the portion that conducts heat can be constructed from an electrically insulative/thermally conductive material such as AlN, whereas the portion that that does not conduct heat can be constructed from a thermally insulative material such as a plastic, ceramic, polymer, and the like. In the example in FIG. 3, the portion of the fluid tube 212 that conducts heat is identified as heat exchange portion 314 and is constructed of AlN. The heat exchange portion 314 is in contact with the thermal interface 312 at the exterior surface 310 of the busbar 208N. The other portion of the fluid tube 212 that is not used to conduct heat either into or from the busbar 208N is identified as body portion 316. However, in other examples, the portion of the fluid tube 212 in contact with the busbar 208N and the portion of the fluid tube 212 that is not in contact with the busbar 208N and is not used to conduct heat into or from the busbar 208N can be constructed of the same material, such as AlN.

Because the body portion 316 may not be used to conduct heat, and therefore may not need to be electrically insulative, the body portion 316 can be constructed of a metal, ceramic, polymer, plastic, and the like. The heat exchange portion 314 may be bonded or affixed to the body portion 316 using various technologies such as welding, glue, and the like. In some examples, the heat exchange portion 314 is formed from an electrically insulative/thermally conductive material such as AlN, while the body portion 316 is formed from a thermally insulative material, and/or has insulation installed on an exterior of the body portion 316. In this configuration, the temperature control fluid 308 can remove or add heat to the busbar 208N through the electrically insulative/thermally conductive material at the thermal interface 312, while reducing heat loss or heat gain from the environment around the fluid tube 212 through the body portion 316. For example, if in a cooling mode whereby the temperature of the temperature control fluid 308 is set to remove heat from the busbar 208N, the environment around the fluid tube 212 may have a temperature high enough that heat may be transferred from the environment into the temperature control fluid 308 rather than heat from the busbar 208N, reducing the effectiveness of the fluid tube 212 in cooling the busbar 208N.

Adding a thermally insulative layer around the body portion 316 and/or constructing the body portion 316 from a thermally insulative material can reduce the amount of heat lost or added to the temperature control fluid 308 into or from the environment around the fluid tube 212 rather than from the busbar 208N, thereby increasing the effectiveness of the temperature control fluid 308. In the present example, thermal heat transfer into or out of the temperature control fluid 308 is primarily focused through the heat exchange portion 314. It should be noted, however, that the fluid tube 212 may also be constructed entirely of an electrically insulative/thermally conductive material such as AlN. Further, the size of the heat exchange portion 314 is merely illustrative, as the heat exchange portion 314 may be larger or smaller depending on the particular use.

The thermal interface 312 is the thermal interface between the busbars 208 and the fluid tube 212. While heating or cooling, because the busbars 208 and the fluid tube 212 may be formed from different materials, the busbars 208 and the fluid tube 212 may expand and contract at different rates. This expansion and/or contraction can cause the busbars 208 and the fluid tube 212 to move laterally against each other during the expansion and contraction. In some examples, the thermal interface 312 may be designed as a dynamic or moving interface, whereby the busbars 208 and the fluid tube 212 are allowed to laterally move in relation to each other. In other examples, it may be desirable to maintain a constant interface between the busbars 208 and the fluid tube 212. In these examples, an interface material may be used, illustrated in more detail in FIG. 4.

Figure 4:
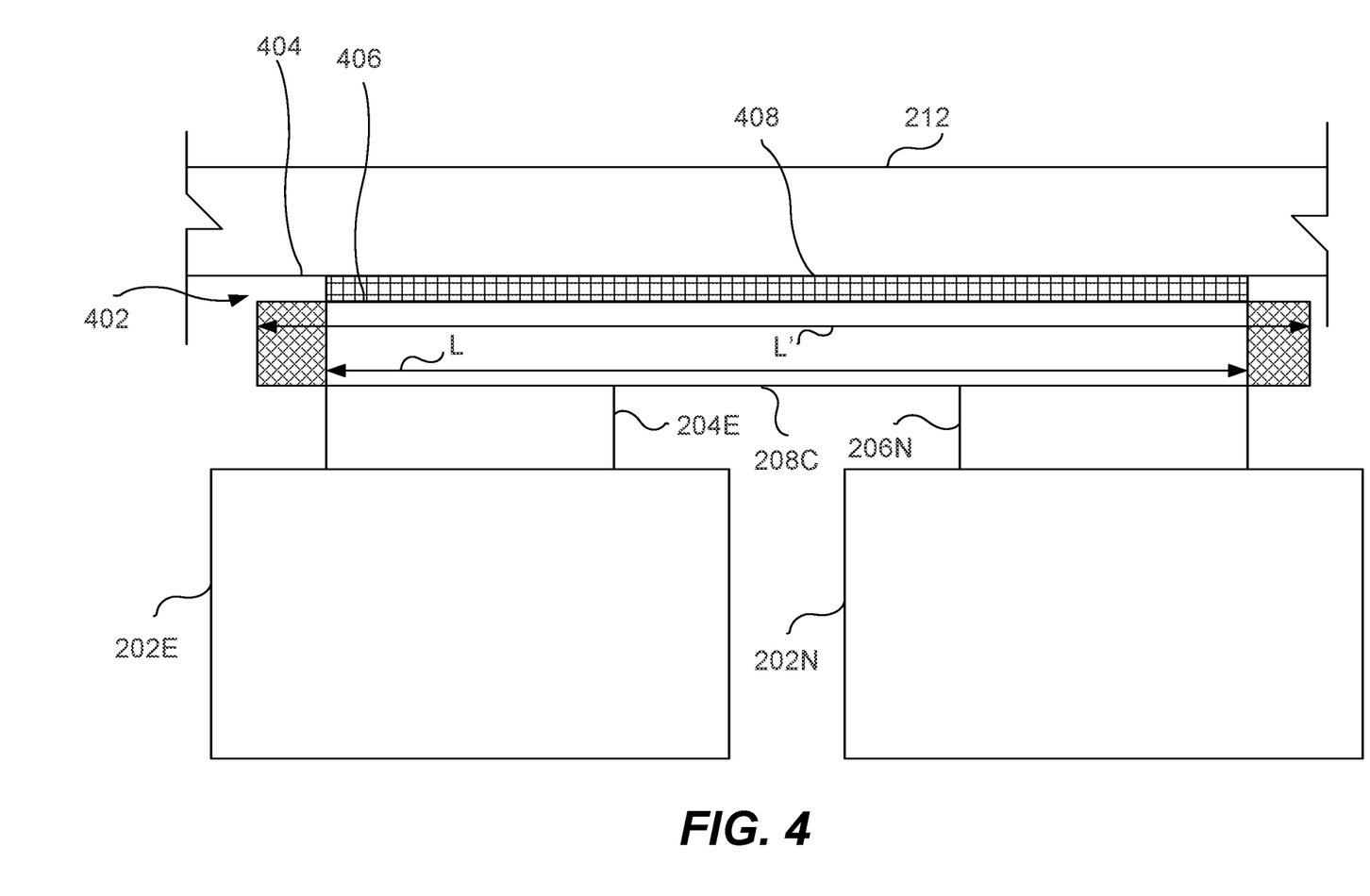
FIG. 4 is a sideview of a portion of a battery system illustrating the expansion and contraction of a busbar, in accordance with various aspects of the presently disclosed subject matter.

FIG. 4 is a sideview of a portion of the battery system 200 illustrating the expansion and contraction of the busbar 208C, in accordance with various aspects of the presently disclosed subject matter. Illustrated in FIG. 4 are the cells 202E and 202N, the terminals 204E and 206N of the cells 202E and 202N, respectively, and the busbar 208C electrically connecting the terminal 204E to the terminal 206N. In FIG. 4, the busbar 208C expands from a non-expanded length of L to an expanded length of L'. The busbar 208C expands to length L' and contracts to length L as the temperature of the busbar 208C changes. Metal, having the freedom to move, increases and decreases in size with an increase or decrease in temperature. The magnitude of expansion depends on the metal being used and the degree of temperature change from a reference temperature. For example, copper has a coefficient of expansion of 0.0000094 inch per inch per degree F., between 70° F. and 212° F. Unless allowed to move freely along a cooling interface 402 between a first surface 404 of the fluid tube 212 and a second surface 406 of the busbar 208C proximate to the cooling interface 402, the expansion and contraction of the busbar 208C due to temperature changes in the busbar 208C can create issues and failures, especially when the fluid tube 212 does not expand and contract at the same rate or length as the busbar 208C.

In FIG. 4, length L represents a length when the busbar 208C is at a first temperature and length L' is a length when the busbar 208C is a second, higher temperature. As illustrated, the busbar 208C has expanded due to heat. However, the tube 212 has either expanded at a different rate than the busbar 208C. If the busbar 208C is directly affixed to the fluid tube 212, the stress from the change in length of the busbar 208C relative to the fluid tube 212 can cause stress fractures in the fluid tube 212 or the busbar 208C, a failure of the mechanical connection between the first surface 404 of the fluid tube 212 and the second surface 406 of the busbar 208C, or other potential issues.

To reduce the potential for mechanical issues relating to the expansion and contraction of the fluid tube 212 and/or the busbar 208C, joint material 408 is provided. The joint material 408 is a thermally conductive and electrically insulative material that provides for a degree of relatively movement between the first surface 404 of the fluid tube 212 and the second surface 406 of the busbar 208C. It should be noted that in some examples, the joint material 408 is not electrically insulative, as the fluid tube 212 can provide for a degree of electrical insulation. In some examples, the joint material 408 is a bonding material that is at least partially flexible, such as an aluminum nitride adhesive formed from an epoxy resin and aluminum nitride power or particulate. In some examples, AlN fillers can be added to or mixed with various epoxy resins or other material that may, in their pure form, be thermally insulative. When the AlN fillers are added, sometime up to sixty percent (60%) or more of the volume of the resulting material being AlN fillers, the material may be thermally conductive, flexible, and electrically insulative. Other materials may be used including, but not limited to, boron nitride, alumina, and beryllia. The fillers can be particulate or in powder form such as aluminum nitride powder, boron nitride powder, alumina powder, or beryllia powder. The resulting mixture of filler and resin results in the joint material 408 providing a sufficient bond between the fluid tube 212 and the busbar 208C, while providing for a thermal transfer of heat into and out of the busbar 208C using a cooling/heating system, illustrated by way of example in FIG. 5.

Figure 5:
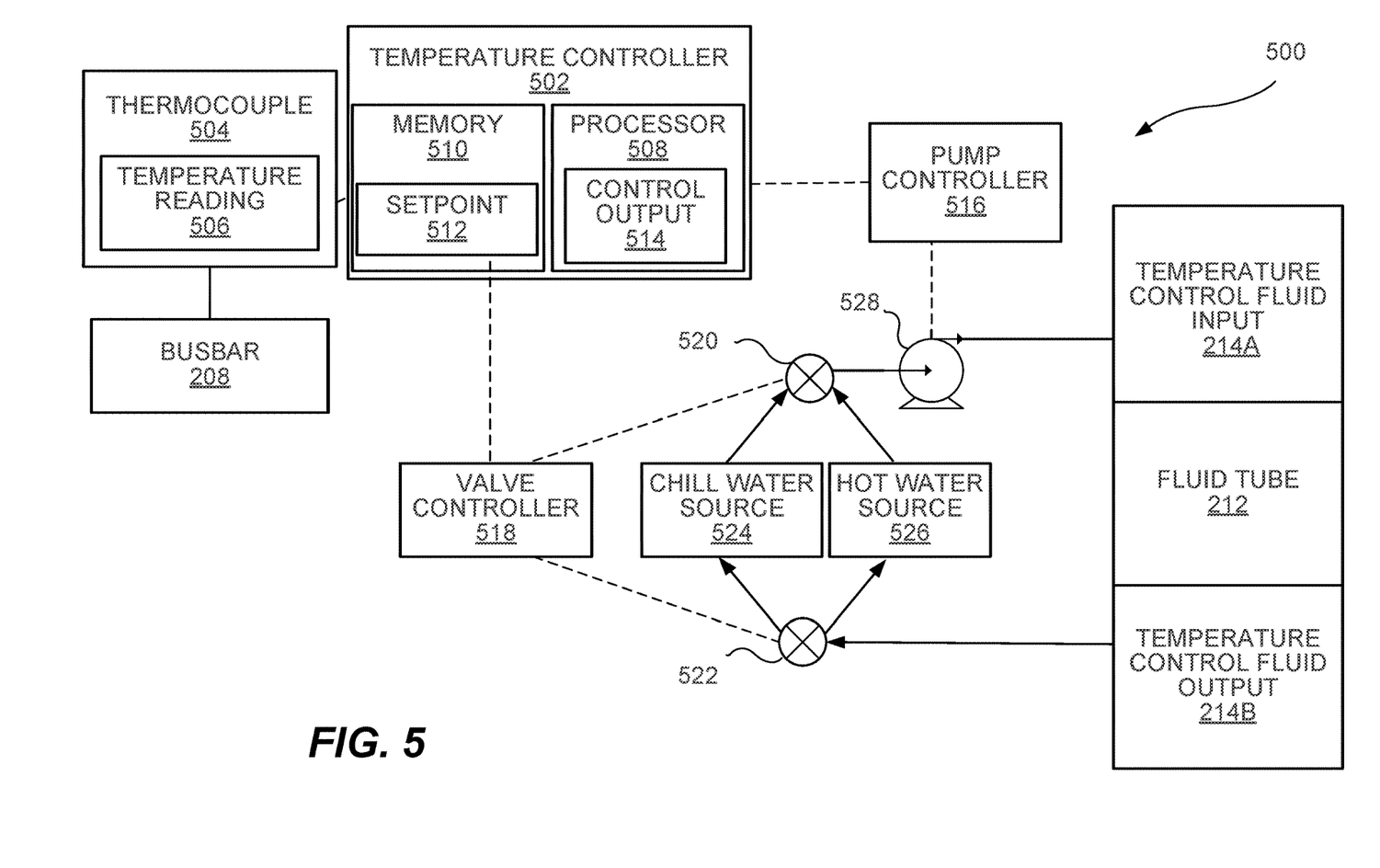
FIG. 5 is a diagram of cooling/heating system using a fluid tube, in accordance with various aspects of the presently disclosed subject matter.

FIG. 5 is a diagram of a cooling/heating system 500 using the fluid tube 212 of FIG. 1, in accordance with various aspects of the presently disclosed subject matter. Various electrical components of the cooling/heating system 500 are powered by the battery module 118. As noted above, the fluid tube 212 may be used to remove heat from the busbars 208 and/or add heat to the busbars 208. The temperature control fluid 308 illustrated in FIG. 3 can be relatively hotter or relatively cooler than the busbars 208 to either add or remove heat by heat transfer through the thermal interface 312 and into or out of the electrically insulative/thermally conductive fluid tube 212. The temperature control fluid 308 is pumped into the fluid tube 212 by entering through the temperature control fluid input 214A, through the fluid tube 212, and out through the temperature control fluid output 214B.

To control the flow of the temperature control fluid 308, a temperature controller 502 is used. The temperature controller monitors various aspects of the cooling/heating system 500 to determine the flow of the temperature control fluid 308. For example, the temperature controller 502 may receive a temperature input from a thermocouple 504. The thermocouple 504 measures a temperature reading 506 of at least one of the busbars 208. The thermocouple 504 transmits the temperature reading 506 to the temperature controller 502. A processor 508 of the temperature controller 502 receives the temperature reading 506 and accesses a memory 510 to retrieve a setpoint 512. The setpoint 512 is a high temperature value and/or a low temperature value. If the processor 508 determines that the temperature reading 506 is above or below a certain value, meaning the temperature of the busbars 208 is high or low, the processor 508 outputs a control output 514 to cause the temperature control fluid 308 to be pumped through the fluid tube 212. In some examples, a first setpoint 512 indicates a high temperature setpoint and a second setpoint 512 indicates a low temperature setpoint. In this example, the temperature controller 502 can position output valve 520 and return valve 522, a return valve, as well as energize the pump 528, to provide the chilled water source 524 through the fluid tube 212 to cool the at least one of the plurality of busbars when the temperature reading 506 is above a first temperature setpoint 512. Further, in this example, the temperature controller 502 can position the output valve 520 and the return valve 522, as well as energize the pump 528, to provide the hot water source 526 through the fluid tube 212 to heat the at least one of the plurality of busbars when the temperature reading 506 is below a second temperature setpoint 512.

The processor generates the control output 514 and the temperature controller 502 transmits the control output 514 to the pump controller 516 and the valve controller 518. When the control output 514 is received by the valve controller 518, the valve controller 518 causes the output valve 520 and the return valve 522 to open to the source determined by the processor 508. In the example in which the temperature reading 506 is determined by the processor 508 to be above a certain temperature value, the output valve 520 opens to the chilled water source 524, designed to remove heat from the busbars 208. The return valve 522 also opens to the chilled water source 524, providing the return line from the temperature control fluid output 214B back to the chilled water source 524. In the example in which the temperature reading 506 is determined by the processor 508 to be below a certain temperature value, the output valve 520 opens to the hot water source 526, designed to add heat to the busbars 208. The return valve 522 also opens to the hot water source 526, providing the return line from the temperature control fluid output 214B back to the hot water source 526. Upon receipt of the control output 514, the pump controller 516 energizes a pump 528 to cause the pump 528 to commence pumping from either the chilled water source 524 or the hot water source 526 depending on the control output 514.

Figure 6:
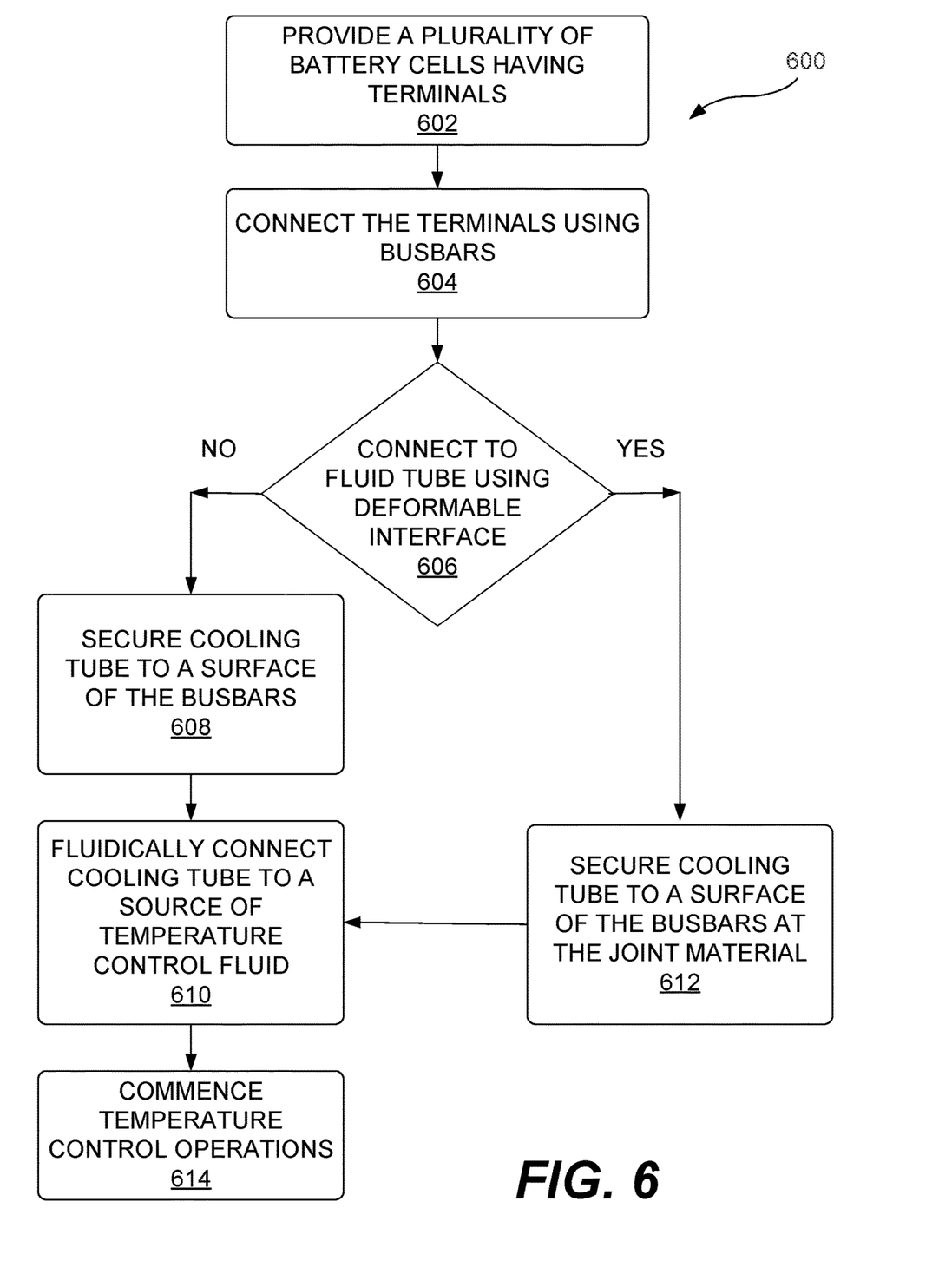
FIG. 6 is a flowchart illustrating a method of assembling a battery system used to power systems of a work machine, according to examples of this disclosure.

FIG. 6 is a flowchart illustrating a method 600 of assembling the battery system 200 used to power systems of the work machine 100, according to examples of this disclosure. The method 600 may be performed by one or more human users. Additionally, and/or alternatively, one or more steps of the method 600 may be performed automatically without human intervention. The method 600 may include different and/or additional steps, or steps may be performed in a different order than described herein.

At step 602, the method 600 includes providing a plurality of cells 202 of a battery module having anode terminals 204 and cathode terminals 206. The cells 202 can be cells for a lithium ion battery, a lead-acid battery, an aluminum ion battery, a flow battery, a magnesium ion battery, a potassium ion battery, a sodium ion battery, a metal hydride battery, a nickel metal hydride battery, a cobalt metal hydride battery, a nickel-cadmium battery, a wet cell of any type, a dry cell of any type, a gel battery, combinations thereof, or the like.

At step 604, the anode terminals 204 and cathode terminals 206 are connected using the busbars 208. The connections between the anode terminals 204 and cathode terminals 206 with the busbars 208 can be electrically connected in a series or parallel configuration, or a combination of both, called a series/parallel configuration.

At step 606, a determination is made as to whether or not the fluid tube 212 is to be thermally connected to the busbars 208 using a deformable interface. In some examples, at least a portion of the busbar 208 used to transfer heat between the busbars 208 and the temperature control fluid 308 is formed from an electrically insulative and thermal conductive material such as Aluminum Nitride (AlN), which is a solid nitride of Aluminum. AlN has a high thermal conductivity of up to 321 W/(m·K) and is an electrical insulator. As the busbars 208 heat up and cool down, the thermal rate of expansion of the busbars 208 may be different enough from the thermal expansion of the fluid tube 212 to cause stress between the two. If the stress is enough to potentially cause damage or a reduction in the efficiency of the thermal transfer, the joint material 408 may be used to provide for a degree of relatively movement between the fluid tube 212 and the busbars 208. The joint material 408 is a bonding material that is at least partially flexible, such as an aluminum nitride (AlN) adhesive. Other materials may be used including, but not limited to, boron nitride, alumina, and beryllia.

If the determination at step 606 that a deformable interface is not to be used, the method 600 includes, at step 608, thermally connecting and securing the fluid tube 212 to the busbars 208. At the thermal interface 312, the fluid tube 212 is affixed to the busbars 208 using technologies such as welding, bolts, screws, other fasteners (fastening), epoxy, glues, combinations thereof, and the like.

At step 610, the method 600 includes fluidically connecting the fluid tube 212 to a source of the temperature control fluid, illustrated by way of example in FIG. 5 using the cooling system 500. If in a busbar 208 temperature reduction mode, the temperature control fluid 308 is received from the chilled water source 524. If in a busbar 208 temperature increase mode, the temperature control fluid 308 is received from the hot water source 526.

If the determination at step 606 that a deformable interface is to be used, the method 600 includes, at step 612, securing the fluid tube 212 to the busbars 208 using the joint material 408. At the thermal interface 312, the joint material 408 is used to bond the fluid tube 212 to the busbars 208 in a manner that provides a degree of relative movement between the fluid tube 212 and the busbars 208.

At step 614, the method 600 includes commencing temperature control operations using the temperature controller 502. The temperature controller 502 receives temperature readings 506 from the thermocouple 504. The processor 508 receives those temperature readings 506 and outputs a control output 514 that causes a chilled water source 524 or a hot water source 526 to be pumped through the fluid tube 212 to control the temperature of the busbars 208.

As mentioned above, designs other than the fluid tube 212 may be used to add to or remove heat from the busbars 208. In some examples, designs other than the fluid tube 212 may be used or needed to remove heat from busbars that are arranged in a pattern or are sized or shaped in a manner not suitable for the use of a tube. An example plate design is illustrated by way of example in FIG. 7, below.

Figure 7:
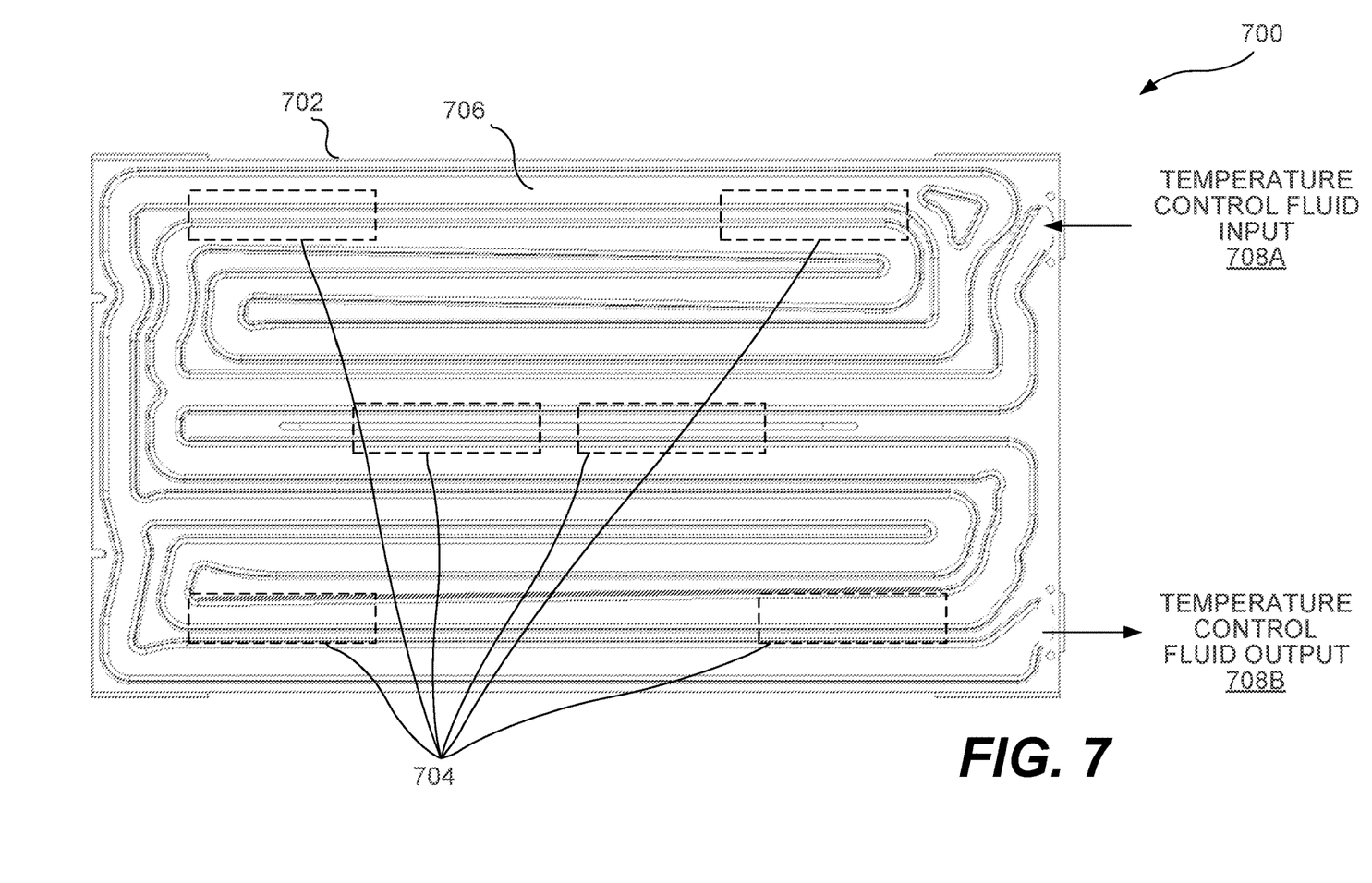
FIG. 7 is a top view illustration of a temperature control plate, according to examples of the present disclosure.

FIG. 7 is a top view illustration of a temperature control plate 700, according to examples of the present disclosure. The temperature control plate 700 includes mounting surface 702. The mounting surface 702 is mounted to busbars 704. The temperature control plate 700 is partially or fully formed from an electrically insulative/thermally conductive material, such as aluminum nitride. The temperature control plate 700 includes fluid tube 706 having an inner channel that receives a temperature control fluid at a temperature control fluid input 708A and outputs the temperature control fluid at a temperature control fluid output 708B. All or a portion of the fluid tube 706 is formed from an electrically insulative/thermally conductive material, such as aluminum nitride. The fluid tube 706 can be formed integrally with the mounting surface 702, meaning the fluid tube 706 and the mounting surface 702 are formed together. The fluid tube 706 can also be attached to the mounting surface 702 using various technologies such as welding, bonding, glues, and the like. In some examples, because the mounting surface 702 provides a degree of electrical insulation, the fluid tube 706 can be formed of an electrically conductive material, as the fluid tube 706 is not in electrical contact with busbars 704 of different voltage potential.

In some examples, the busbars (or other components) of a battery may be heated to a degree that requires an additional level of cooling capability. Rather than relying solely or primarily on the conduction of heat from the battery into the cooling tube to remove heat, one or more heat sinks may be used, described in more detail in FIG. 8.

Figure 8:
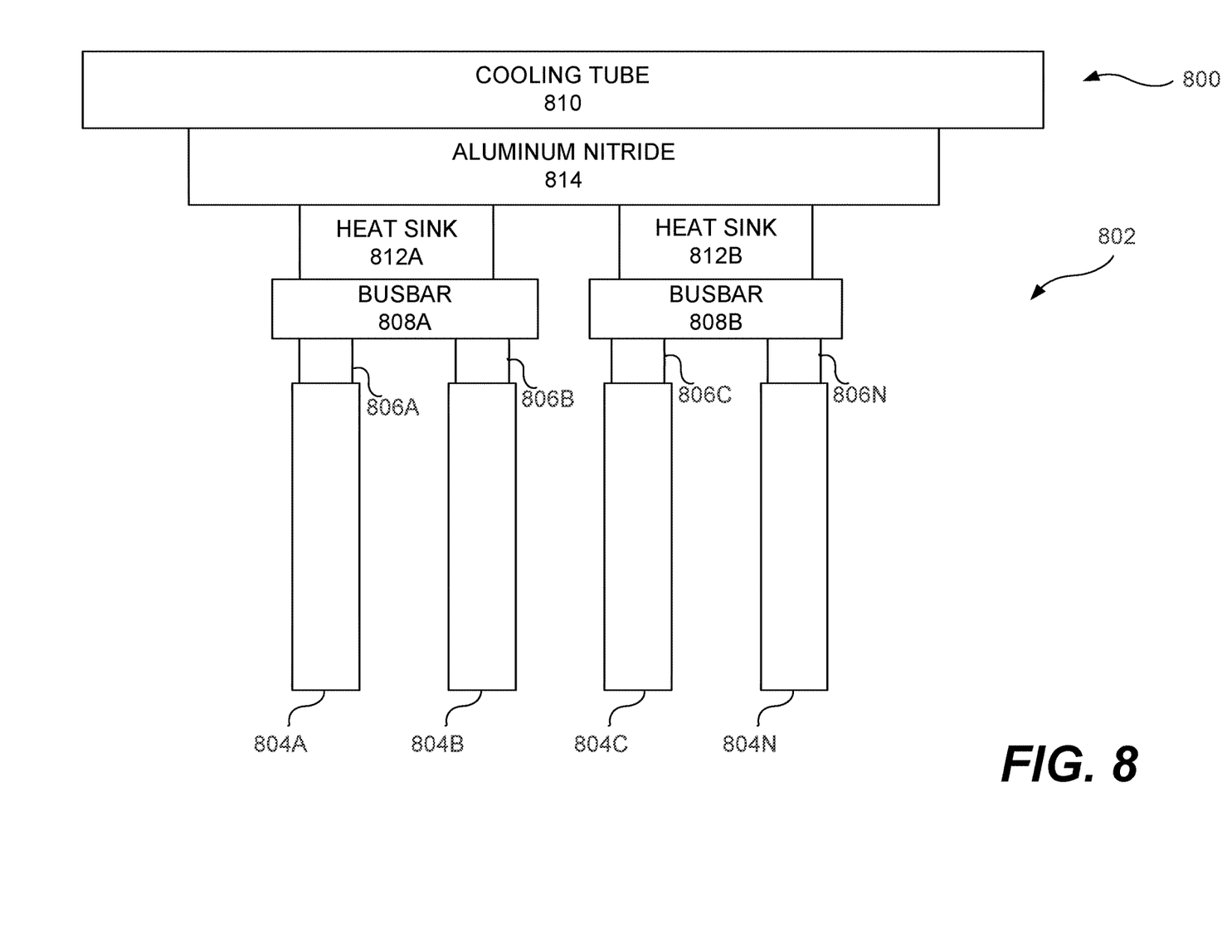
FIG. 8 is a diagram of cooling/heating system 800 using heat sinks, in accordance with various examples of the presently disclosed subject matter.

FIG. 8 is a diagram of cooling/heating system 800 using heat sinks, in accordance with various examples of the presently disclosed subject matter. Illustrated in FIG. 8 is battery module 802. The battery module 802 includes cells 804A-804N that, when electrically connected, provide a battery. The battery module 802 includes terminals 806A-806N that receive the electrical power generated by the cells 804A-804N, respectively, and output that power using the busbars 808A and 808B. The busbars 808A and 808B are in electrical communication with the terminals 806A-806N and one or more exterior systems to deliver the electrical power generated by the cells 804A-804N to one or more electrical loads.

During operation, the temperature of the busbars 808A and 808B may need to be controlled. For example, when conducting electricity, the busbars 808A and 808B may heat up due to resistive heating. To remove at least a portion of that heat, a cooling tube 810 and heat sinks 812A and 812B are provided. The cooling tube 810 is mechanically and thermally connected to the heat sinks 812A and 812B using a thermally conductive and electrically insulative material, such as aluminum nitride 814. The heat sinks 812A and/or 812B can be various types of materials or devices that act as passive heat exchangers that transfer heat from the terminals 806A-806N into the environment around the cooling/heating system 800 and/or into the aluminum nitride 814 and the cooling tube 810. As discussed above, the aluminum nitride 814 can be part of the cooling tube 810 itself or may be a separate component, as illustrated in FIG. 8. The movement of heat into, through, and out of the heat sinks 812A and 812B into the cooling tube 810 through the aluminum nitride 814, by conduction, allows the cooling tube 810 to be in thermal connection with the terminals 806A-806N.

INDUSTRIAL APPLICABILITY

The present disclosure describes example systems and methods for battery busbar cooling systems. The example systems and methods described herein utilize a thermally conductive/electrically insulative material. The thermal conductivity of the material allows for the transfer of heat from or into a busbar from or into a cooling system. The electrical conductivity reduces the probability of a short between two conductors at different voltage potentials, allowing the material to come into direct contact with more than one busbar. In some examples, the material is aluminum nitride. The use of the aluminum nitride, or other thermally conductive/electrically insulative material, can reduce the amount of materials used to construct a busbar cooling system. For example, being electrically insulative, an additional layer of dielectric insulation may not be needed between the busbars and the cooling system. In some examples, depending on the particular configuration, the cooling system using the thermally conductive/electrically insulative material can be thermally attached to the busbar either directly, using a glue or weld for example. In other examples, a flexible, thermally conductive/electrically insulative resin may be used between the busbar and cooling system to allow for the expansion and contraction of the materials of the cooling system and/or the busbar. In some examples, the resin can be thermally and electrically conductive.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system, comprising:
 a battery module, the battery module comprising:
  a plurality of battery cells, each battery cell of the plurality of battery cells having an anode terminal and a cathode terminal, and
  a plurality of busbars, the plurality of busbars electrically connecting the plurality of battery cells, via the anode terminal and the cathode terminal of each battery cell, in a parallel configuration, a series configuration, or a combination of a parallel and series configuration; and
 a fluid tube having an inner wall defining a coolant channel, wherein a cross-section of the fluid tube comprises:
  a heat exchange portion having an exterior surface thermally connected to at least one busbar of the plurality of busbars and an interior surface defining a first section of the inner wall, the heat exchange portion being constructed from a first material, the first material being a thermally conductive, electrically insulative material, and
  a body portion affixed to the heat exchange portion and defining a second section of the inner wall, the body portion being constructed from a second material different from the first material.

2. The system of claim 1, wherein the thermally conductive, electrically insulative material comprises aluminum nitride.

3. The system of claim 1, wherein the second material is thermally insulative.

4. The system of claim 1, further comprising:
 a temperature controller; and
 a thermocouple operably connected to the temperature controller, the thermocouple being configured to output a temperature reading to the temperature controller, the temperature reading indicating a temperature of at least one of the plurality of busbars, wherein the temperature controller is configured to:
  receive the temperature reading;
  cause a pump to direct a first fluid, having a first temperature, through the coolant channel when the temperature reading is above a first temperature setpoint; and
  cause the pump to direct a second fluid, having a second temperature greater than the first temperature, through the coolant channel when the temperature reading is below a second temperature setpoint.

5. The system of claim 1, wherein the fluid tube is physically connected to a surface of at least one busbar of the plurality of busbars.

6. The system of claim 1, wherein the fluid tube is thermally connected to a surface of at least one busbar of the plurality of busbars via a partially flexible joint material.

7. The system of claim 6, wherein the joint material comprises an epoxy resin mixed aluminum nitride powder, boron nitride, alumina, or beryllia.

8. The system of claim 1, wherein the heat exchange portion extends longitudinally along the fluid tube, the heat exchange portion being thermally connected to each of the plurality of busbars.

9. A work machine, comprising:
 an electric motor;
 a battery module powering the electric motor, the battery module comprising:
  a plurality of battery cells, each battery cell of the plurality of battery cells having an anode terminal and a cathode terminal; and
  a plurality of busbars, the plurality of busbars electrically connecting the plurality of battery cells, via the anode terminal and the cathode terminal of each battery cell, in a parallel configuration, a series configuration, or a combination of a parallel and series configuration; and
 a fluid tube having an inner wall defining a coolant channel, wherein a cross-section of the fluid tube comprises:
  a heat exchange portion having an exterior surface thermally connected to at least one busbar of the plurality of busbars and an interior surface defining a first section of the inner wall, the heat exchange portion being constructed from a first material, the first material being a thermally conductive, electrically insulative material, and
  a body portion affixed to the heat exchange portion and defining a second section of the inner wall, the body portion being constructed from a second material different from the first material.

10. The work machine of claim 9, wherein the thermally conductive, electrically insulative material comprises aluminum nitride.

11. The work machine of claim 9, wherein the second material is thermally insulative.

12. The work machine of claim 9, further comprising a cooling/heating system comprising a pump to pump a chill water source to remove heat from the plurality of busbars through the fluid tube or pump a hot water source to add heat to the plurality of busbars through the fluid tube.

13. The work machine of claim 12, further comprising:
 a temperature controller; and
 a thermocouple operably connected to the temperature controller, the thermocouple being configured to output a temperature reading to the temperature controller, the temperature reading indicating a temperature of at least one of the plurality of busbars, wherein the temperature controller is configured to:
  receive the temperature reading;
  cause the pump to direct the chill water source, having a first temperature, through the coolant channel when the temperature reading is above a first temperature setpoint; and
  cause the pump to direct the hot water source, having a second temperature greater than the first temperature, through the coolant channel when the temperature reading is below a second temperature setpoint.

14. The work machine of claim 9, wherein the fluid tube is welded or bonded directly to a surface of at least one of the plurality of busbars at the thermal interface.

15. The work machine of claim 9, wherein the fluid tube is thermally connected to a surface of at least one of the plurality of busbars at the thermal interface using a partially flexible joint material.

16. The work machine of claim 15, wherein the joint material comprises an epoxy resin mixed with aluminum nitride powder, boron nitride powder, alumina powder, or beryllia powder.

17. The work machine of claim 9, wherein the heat exchange portion extends longitudinally along the fluid tube, the heat exchange portion being thermally connected to each of the plurality of busbars.

18. A method of assembling a battery system, comprising:
providing a plurality of battery cells having anode terminals and cathode terminals;
connecting the plurality of battery cells in a parallel configuration, a series configuration, or a combination of a parallel and series configuration using a plurality of busbars; and
thermally connecting a fluid tube to the plurality of busbars, the fluid tube having an inner wall defining a coolant channel, wherein a cross-section of the fluid tube comprises:
   a first portion of a thermally conductive and electrically insulative material, the first portion defining a first section of the inner wall, and
   a second portion attached to the first portion and defining a second section of the inner wall, the second portion being a second material different from the thermally conductive and electrically insulative material.

19. The method of claim 18, wherein the fluid tube is connected to the plurality of busbars by welding, fastening, or gluing the fluid tube to the plurality of busbars.

20. The method of claim 18, wherein the fluid tube is connected to the plurality of busbars using a joint material comprising an epoxy resin and aluminum nitride powder, boron nitride powder, alumina powder, or beryllia powder.

* * * * *